July 22, 1958
C. L. HAMM
2,844,745
FLUID-COOLED DYNAMOELECTRIC MACHINE
Filed July 13, 1953
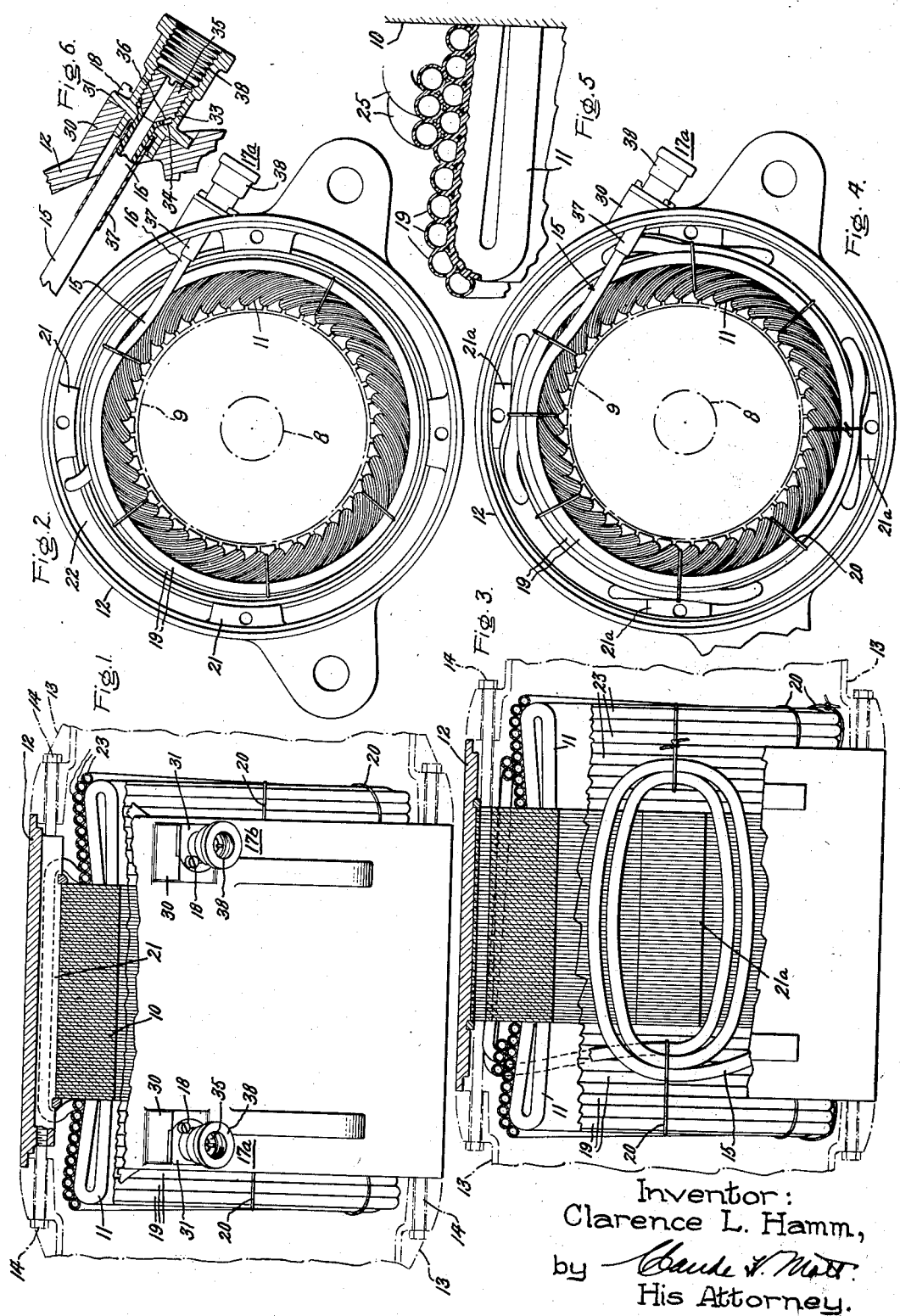
Inventor:
Clarence L. Hamm,
by
His Attorney.

United States Patent Office 2,844,745
Patented July 22, 1958

2,844,745
FLUID-COOLED DYNAMOELECTRIC MACHINE

Clarence L. Hamm, Marblehead, Mass., assignor to General Electric Company, a corporation of New York Application July 13, 1953, Serial No. 367,380

5 Claims. (Cl. 310—57)

My invention relates to dynamoelectric machines and more particularly to an arrangement for keeping them cool.

In dynamoelectric machines having totally enclosed casings so that they may be used in locations where it is desirable that there be no communication between the interior of the machine and the surrounding air as, for example, where they are operated in an atmosphere containing dust, water, acids, gases, lint or other particles which will adhere to the surfaces of the motor and decrease the effectiveness of the cooling of the motor, it is difficult to dissipate the heat generated so as to keep the machine temperature within required limits. In the past many special cooling devices have been used to solve this problem. However, these constructions usually have resulted in extensive modifications to the standard machine design to accommodate these cooling devices. Such machines have been costly and difficult to produce. In certain constructions special heat exchangers spaced from the stator windings have been used to cool the internal air, in others, liquid carrying channels passing through the stator core or winding slots have been used. These have been complicated, expensive and susceptible to insulation breakdown problems due to the leakage of the coolant.

Accordingly, an object of my invention is to provide means for preventing an objectionable rise in the temperature of a totally enclosed dynamoelectric machine in a simple and reliable manner.

A further object of my invention is to provide an arrangement for cooling enclosed dynamoelectric machines which requires very minor modifications to the castings, insulation, and fabricated parts of the motor.

Still another object of my invention is to provide means for substantially eliminating fluid leakage failures in a fluid cooled dynamoelectric machine.

Further objects and advantages will become apparent and my invention will be better understood from the following description referring to the accompanying drawing, and the features of novelty which characterize my invention will be pointed out with particularity in the claims annexed to and forming part of this specification.

In the drawing,

Fig. 1 is a side elevational view of a totally enclosed dynamoelectric machine embodying my invention, partly broken away to more clearly illustrate the construction;

Fig. 2 is an end view of the embodiment shown in Fig. 1 with the end shield removed;

Fig. 3 is a side elevational view of a dynamoelectric machine embodying a modification of my invention, partly broken away to illustrate more clearly this construction;

Fig. 4 is an end view of the modification of Fig. 3;

Fig. 5 is an enlarged fragmentary sectional view illustrating another modification of my invention; and Fig. 6 is a fragmentary sectional view showing the coupling element construction of my invention.

In accordance with one aspect of my invention, a continuous tube through which a suitable fluid coolant, as for example water, may be circulated, and which is preferably formed of a flexible insulating material, has one end connected to a coupling element extending through the motor casing and is wrapped around the overhanging end turns of the stator winding at each end of the stator before being connected to another coupling unit extending through the motor casing. Since the turns of tubing are formed of insulating material, they may be placed in direct contact with the end turns to provide the most effective transfer of heat and, in this arrangement, the end turns require no special insulation to prevent the tubing from short circuiting them. These turns of tubing may be tied to the stator windings by cording or secured thereto by such means as dipping into a varnish or shellac or by heating them slightly to partially melt the tubing to fuse them to the stator winding end turns. One modification of my invention relates to the placing of additional turns of tubing about the various stator supporting lugs in direct contact with the stator core to assist in carrying away the heat from the stator core.

Referring to the drawing, I have shown my invention in connection with the totally enclosed dynamoelectric machine. The stationary member of this machine includes a laminated core structure 10 having windings with overhanging end turns 11. The machine is enclosed by a cylindrical housing 12 having end shields 13 of usual construction bolted thereto as at 14. Any suitable rotor 9 for the machine mounted on a shaft 8 journaled in end shields 13 may be provided.

In order to prevent an undesirable temperature rise in the motor, I provide the following construction. A continuous tube 15 having one end 16 connected to a coupling member 17a which will hereinafter be more fully described and which extends through the motor housing 12. Coupling member 17a is secured by means of suitable screws 18 to cylindrical casing 12. Tubing 15 is wound in a plurality of helical turns 19 about the outer diameter of the overhanging end turns 11 of the stator winding and are preferably secured thereto by means of ties 20. Since turns 19 are in direct and intimate contact with the overhanging end turns 11 and because the flexibility of the tubing permits it to conform to the irregularities of the outer periphery of the end turns, heat is conducted directly from the winding end turns to the tubing over a relatively large area. After tubing 15 is wound around one end of the stator windings it passes through the space 22 between adjacent lugs 21 which secure the stator 10 to the housing 12. It is then spiraled around the winding end turns at the other end of the motor in direct contact with said end turns as indicated at 23 from whence it is connected to coupling member 17b.

While I prefer to make the tubing 15 of a plastic or other flexible insulating material because such material can easily and automatically conform to the uneven contour of the windings, it may be made of copper or other metal coated with an insulating material. It is important that tubing 15 be closely wound about the end turns 11 to assure contact therewith to promote the greatest amount of heat transfer between the windings and the tubing. Further, while I prefer to use continuous tubing having no internal connections which are possible sources of leakage failures, it is apparent that tubing 15 could be made in a plurality of sections.

The machine is installed by connecting coupling elements 17a and 17b to a source of fluid coolant, which may be any suitable liquid such as water or any suitable gas such as air. The coolant may be circulated through the tubing 15 by any desired means.

It will be seen that this construction provides cooling coils presenting a relatively large cooling surface in contact with the coil end turns and that because the tubing has thin walls the continuous flow of cooling fluid through the tubing will absorb and carry away a large amount of heat from the interior of the motor.

Figs. 3 and 4 illustrate a modification of my invention in which like parts are identified by like numerals indicated for Figs. 1 and 2 and in which the continuous tubing 15 in addition to being wrapped around the winding end turns, is also wrapped around the lugs 21a of the stator core in a flat pancake form directly in contact with the iron core of the stator. In this way these coils assist in carrying heat away from the stator laminations directly. Using this form of my invention, I prefer to assemble the tubing 15 on the end turns and over the stator supporting lugs 20 prior to inserting the stator and its winding into the stator housing 12. To accomplish this, I prefer to make lugs 21a integral with the stator laminations 10.

Fig. 5 illustrates a modification of my invention wherein I secure the spiral coils of plastic to the winding end turns by heating the assembly after the tubing is spiraled around the winding end turns 11 to cause the fusion of the plastic tubing to the windings and to the adjacent turns of tubing. As shown in the modification of Fig. 5, the heating of the plastic tubing results in a slight flattening of the surface of the tubing adjacent the windings to increase the area of contact between the windings and the tubing. It is, of course, possible, instead of heating the tubing to fuse the plastic material, to dip the completed stator with the tubing installed in a varnish, permafil, or other similar material to secure the individual turns of the tubing together and to secure them to the drawings.

As further illustrated in Fig. 5, additional layers 25 of tubing may be used to increase the cooling capacity of my invention to obtain any desired amount.

Fig. 6 illustrates the construction of the coupling element of my invention. A boss 30 is formed on the housing 12. Coupling element base 31 is adapted to be seated on boss 30 and secured thereto by screws 18. The inner bore 33 of the coupling element is provided with a tapered seat 34 at its inner end. Tubing 15 is inserted into the inner end of inner bore 33 and a centrally apertured clamp screw 35 is threaded into the outer end of the coupling element. Clamp screw 35 is provided with a tapered end 36 which cooperates with tapered seat 34 to clamp and seal the end of tubing 15 to the coupling element. Sleeving 37 may be provided to reinforce tubing 15 if desired. The outer threaded end 38 is adapted to receive a standard pipe fitting of the external fluid supply. It will be apparent that this coupling element construction eliminates the leakage failures encountered by the possible breaking of the seal between the coupling element and tubing 15 when the machine is connected to the coolant lines by making the seal between the coupling element and the tubing independent of any stress when the coolant lines are connected. This construction and the absence of internal tubing joints serve to substantially eliminate fluid leakage failures.

While I have shown and described specific embodiments of my invention, modifications thereof will occur to those skilled in the art. It is to be understood, therefore, that I intend by the appended claims to cover all such modifications as fall within the true spirit and scope of my invention.

What I claim as new and desire to secure by Letters Patent of the United States is:

1. A totally enclosed dynamoelectric machine having a rotor and a stator, a frame surrounding said stator, said stator having a core provided with lugs for attachment to said frame, said stator being provided with a winding having end turns, and a continuous plastic tube having one portion tightly spiraled around each end turn in contact therewith and a second portion spiraled around said lugs in intimate contact with said core, said tubing being adapted to carry a fluid for cooling said machine.

2. A dynamoelectric machine having a rotor and a stator, windings for said stator and a plastic tubular member tightly spiraled around and in intimate contact with said windings, said tubular member being secured to said windings by being fused thereto.

3. A dynamoelectric machine having a stator, said stator being provided with a winding having an end turn, and coolant means of adjustable peripheral length positioned around said winding end turn in intimate contact therewith, said coolant means comprising a plurality of spiraled turns of flexible plastic tubing conforming to the irregularities in said winding end turn.

4. A totally enclosed dynamoelectric machine having a rotor and a stator, a frame surrounding said stator, support lugs between said stator and said frame for securing the same in spaced relationship, said stator being provided with a winding having end turns, and a continuous tubular member formed of a flexible insulating material having one portion tightly spiraled around each end turn in contact therewith, and a second portion spiraled around said lugs in intimate contact with said core, said tubular member being adapted to carry a fluid for cooling said machine.

5. A dynamoelectric machine having a stator, said stator being provided with windings having end turns, and a tubular member formed of flexible insulating material tightly spiraled around and in intimate contact with said end turns to damp the vibrations in said end turns to minimize vibrational stresses in said end turns, said tubular member further being adapted to carry a fluid for cooling said machine.

References Cited in the file of this patent

UNITED STATES PATENTS

| Number | Name | Date |
| --- | --- | --- |
| 1,001,643 | Howell | Aug. 29, 1911 |
| 1,453,166 | Nobuhara | Apr. 24, 1923 |
| 1,607,288 | Laffoon | Nov. 16, 1926 |
| 1,830,457 | Apple | Nov. 3, 1931 |
| 1,863,360 | Weatherhead | June 14, 1932 |
| 1,929,905 | Slotsky | Oct. 10, 1933 |
| 2,113,204 | Wasser | Apr. 5, 1938 |
| 2,447,339 | Hoover | Aug. 17, 1948 |

FOREIGN PATENTS

| Number | Country | Date |
| --- | --- | --- |
| 165,383 | Great Britain | June 30, 1921 |
| 579,316 | Germany | June 23, 1933 |